April 21, 1959
B. M. SMALLEY
2,883,135
SUPPORT FOR ELECTRICAL DEVICES
Filed Jan. 13, 1955
2 Sheets-Sheet 1
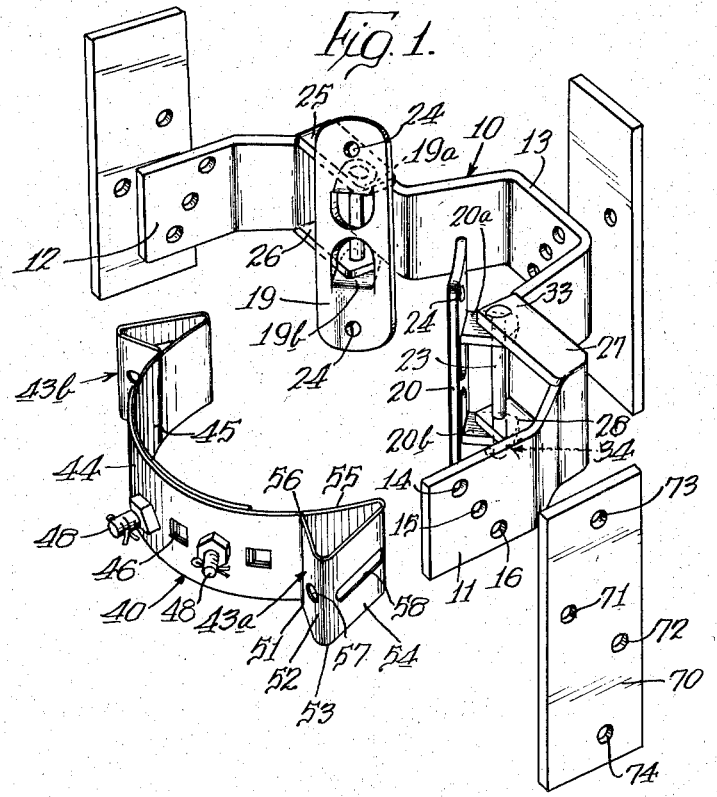
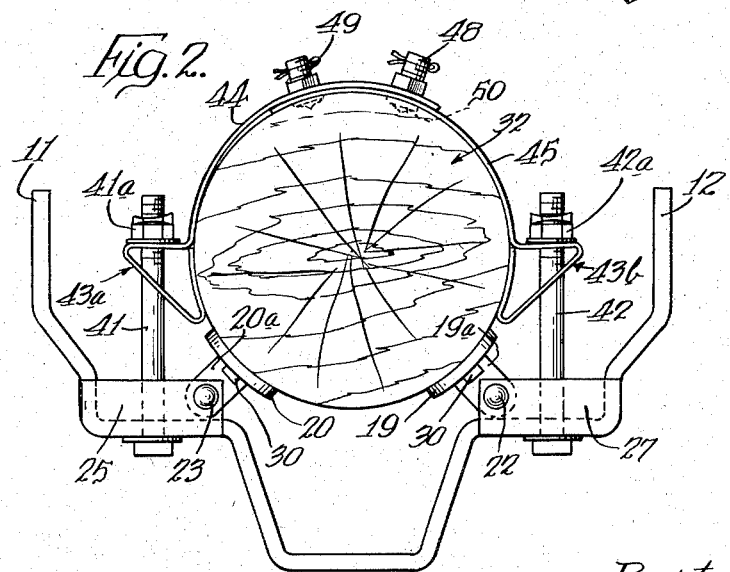
INVENTOR.
Burton M. Smalley
BY
Mason, Kolehmainen, Rathburn & Wyss
Attys.

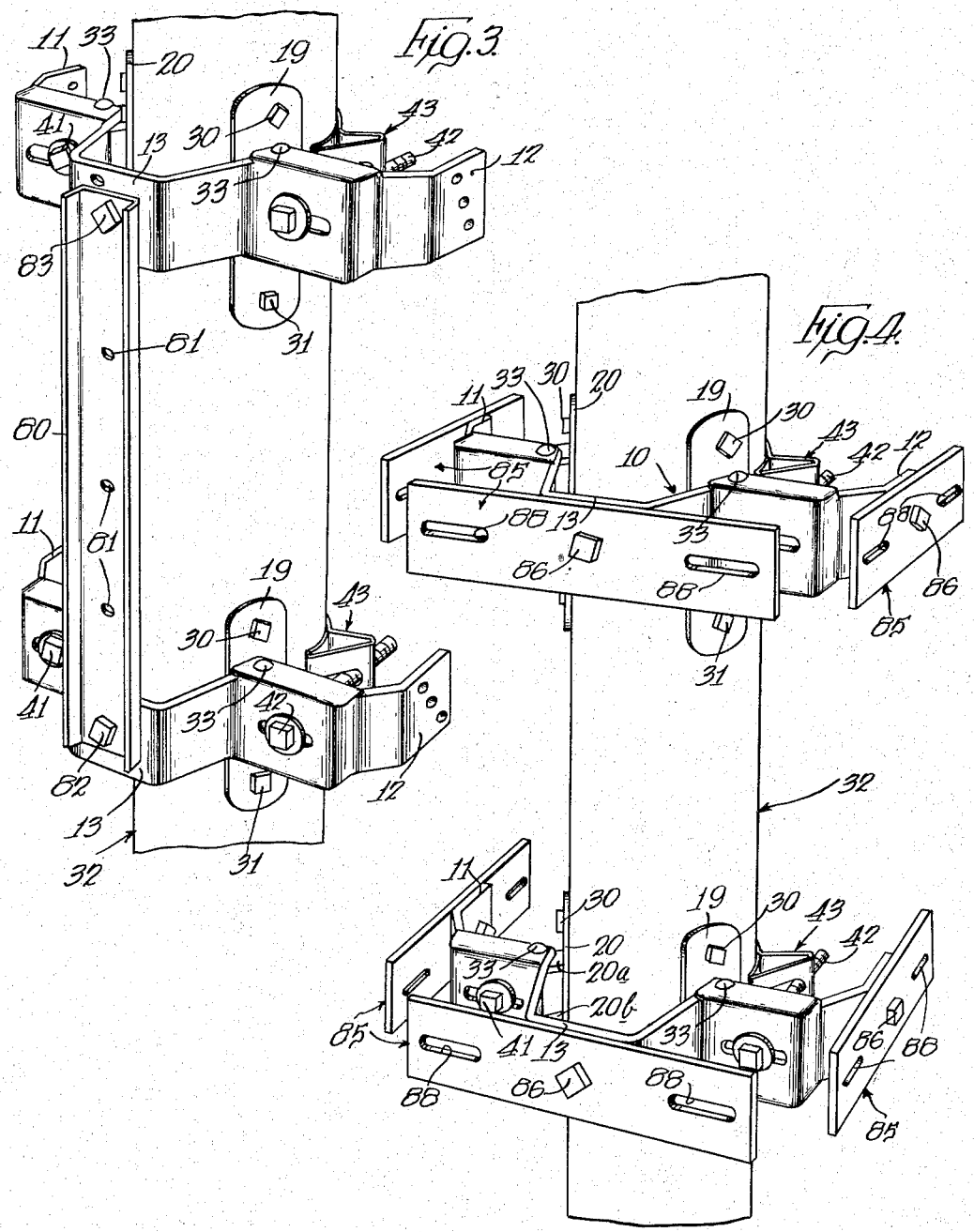

2,883,135
SUPPORT FOR ELECTRICAL DEVICES

Burton M. Smalley, Highland Park, Ill., assignor to Joslyn Mfg. & Supply Co., Chicago, Ill., a corporation of Illinois Application January 13, 1955, Serial No. 481,581

7 Claims. (Cl. 248—230)

The present invention relates generally to a support for electrical devices, and particularly to a support for mounting a plurality of distribution transformers or electrical capacitors in different positions at an elevated location on a lighting pole or the like.

Distribution transformers and capacitors of the type particularly contemplated for use with the support of the present invention are manufactured in various sizes. Such electrical devices are generally cylindrical or rectangular in shape and vary in physical size in accordance with the kva. ratings of the transformers or in accordance with the capacitance of the capacitors. As manufactured and delivered, they frequently include a plurality of mounting lugs which extend outwardly from the casing for the device or from a bracket permanently attached thereto. The numbers and locations of the mounting lugs vary from one size of device to the next, and it is desirable that the hangers by which the devices are mounted on the lighting poles be readily adaptable to support devices of any size or of mixed sizes.

Certain prior art transformer hangers comprise two or more separate brackets for each transformer to be hung from the pole. When, for example, it is desired to mount a cluster of three transformers on a single pole with a support of this prior type, it is especially difficult to properly align each of the support brackets on the pole to enable the facile attachment thereto of the transformer mounting lugs.

It is an object of the present invention, therefore, to provide a cluster support for electrical devices which may be quickly assembled and accurately aligned in an elevated position on a lighting pole.

Another object of the present invention is to provide a new and improved cluster support which is readily adaptable for application with poles of various diameters and to support electrical devices of various sizes.

It is still another object of the invention to provide an improved cluster support of low cost and rugged construction having a high load bearing capacity, which may be firmly and rigidly attached to a support pole in any desired vertical position along the pole.

Accordingly, there is provided a generally U-shaped bracket which is provided with a plurality of mounting faces and which is attached by means of pivotally supported feet to the support pole. A somewhat flexible universal strap extends part way around the pole and is attached near the extremities thereof to the support bracket. When the bracket assembly of this invention is employed in supporting a plurality of the larger size transformers, for example, two such support brackets are arranged, one above the other, on the pole, and the transformers are each supported therebetween on corresponding mounting faces of the brackets.

The invention, both as to its organization and method of operation, together with further objects and advantages thereof, will best be understood by reference to the following description taken in connection with the accompanying drawings, in which:

Fig. 1 is an exploded perspective view of a cluster support bracket constructed in accordance with the present invention;

Fig. 2 is a top plan view, partially fragmentary, of a transformer cluster support bracket embodying the present invention and which is attached to a support pole;

Fig. 3 is a perspective view, partially fragmentary, of the present invention employing a pair of support brackets and adapters for use in supporting in a single cluster of transformers, for example, of different sizes; and Fig. 4 is a perspective view, partially fragmentary, of another embodiment of the invention employing a pair of cluster support brackets for supporting a plurality of relatively large electrical devices.

Referring now to the drawings, and more particularly to Fig. 1, a generally U-shaped support bracket 10 is provided with inwardly and outwardly inclined portions to define integral mounting faces 11 and 12 at the extremities thereof, and a mounting face 13 centrally located intermediate the ends thereof. Each of the faces 11, 12 and 13 is provided with three diagonally arranged apertures 14, 15 and 16 for attachment thereto of mounting lugs or adapter plates for use with different sizes and types of transformers or capacitors.

In order to provide a support bracket which is readily adaptable to poles of different diameters, a pair of elongated feet 19 and 20 are each pivotally attached to the support bracket 10. Specifically, the pivotal attachment is provided by means of lug portions 20a and 20b which extend outwardly from the foot 20 intermediate the ends thereof, and a similar pair of mounting lugs 19a and 19b which extend outwardly from the foot 19. These lugs may conveniently be integral portions of the feet struck out at forging temperatures, or they may be separate members welded to the feet. The lugs of each of the elongated feet 19, 20 are provided with aligned apertures for coaction with studs 22 and 23, respectively, for attachment to the support bracket 10. The studs 22 and 23 upon which the support feet are pivoted are supported parallel with the longitudinal axis of the support pole in apertures in plates 25, 26, 27 and 28, respectively. The plates 25, 26, 27 and 28, which are welded by means of conventional arc fillet welds to the top and bottom of the support bracket 10 intermediate the central mounting face 13 and each of the end faces 11, 12, impart rigidity to the bracket 10 to prevent twisting thereof under the weight of the transformers. In order to provide the greatest support for the transformer mounting bracket 10, the upper plates 25, 27 are located above the upper lugs 19a, 20a of the pivoted feet, and the lower plates 26, 28 are positioned above the lower lugs 19b, 20b. In this way the weight of the transformers which are supported on the bracket 10 is substantially equally distributed between the upper and lower outstanding lugs on the pivoted feet. Because there is a shear stress only on the bolts 22, 23, they may conveniently be held in place by means of the headed end portions at the top and cotter pins and associated apertures 34 in the studs 23 at the bottom.

The elongated feet 19, 20 are each provided with a pair of apertures 24, one at either end thereof, whereby the feet and support bracket 10, which is connected thereto, may conveniently be lagscrewed by means of lagscrews 30, 31 to the pole 32 (Fig. 3, Fig. 4). The face portion of each of the feet 19, 20 which is adapted to engage the surface of the pole is so shaped as to substantially conform to the rounded pole surface.

In order to relieve the longitudinal stress on the lagscrews 30, 31 when transformers are supported on the mounting faces 11, 12, 13 of the support bracket 10, a semicircular universal band assembly 40 is positioned about the pole diametrically opposite the minor arc of the pole as defined by the support feet 19 and 20. This universal band assembly 40 is attached near the ends thereof to the bracket 10 by means of a pair of headed bolts 41 and 42 and associated nuts 41a and 42a.

Specifically, the universal band assembly 40 includes a pair of partially overlapping somewhat flexible arcuate metallic bands 44 and 45 which are each provided with a plurality of spaced rectangularly-shaped apertures 46 adapted to receive a pair of threaded studs 48 and 49. The studs 48 and 49 are each provided with a rectangularly-shaped body portion conforming to the shape of the apertures 46 and a tapered head portion 50 which is adapted to be driven into the support incident to tightening of the studs 41 and 42. The band assembly 40 is provided at its ends with attaching means in the form of offstanding triangularly-shaped ears 43a and 43b for receiving and engaging the studs 41 and 42, respectively. Each of the ears 43 is formed by bending the band outwardly at 51 through an angle of approximately 90° to provide a first leg 52 inclining the band inwardly through an angle of approximately 45° at 53 to provide a second leg 54, and inclining the band back on itself through an angle of approximately 45° intermediate the band at 53 and the end of the band to provide a third leg 55. The end of the third leg 55 is secured at 56 to the band by means of a fillet weld. With the ears 43a and 43b so formed, a pair of sturdy lugs are provided for attachment of the band assembly 40 to the bracket 10, since the force exerted thereon by the bolts 41, 42 is not directly transmitted to the welded joint. The first leg 52 of each of the ears 43a and 43b is provided with a centrally located aperture 57, and the second leg 54 is provided with an elongated slot 58 to accommodate the body portion of one of the bolts 41 and 42.

Having the major portion of the transformer cluster support structure hereinbefore described clearly in mind, the invention may best be understood by a consideration of the manner in which the support structure is used in mounting a plurality of transformers on a support pole. When the disassembled support assembly is taken into the field to be used, for example, in hanging a cluster of transformers about a lighting pole, the support feet 19, 20 are already assembled to the bracket 10, but the universal band 40 is disassembled to the extent that the two segments 44 and 45 and the two bolts 48 and 49 and their associated parts are separated from the bracket 10. The bracket 10 is elevated to the desired position on the pole and the support feet 19, 20 are manually pivoted to a position wherein the curved surfaces thereof lie substantially flat against the surface of the pole. The lagscrews are then inserted in the apertures 24 and are driven into the pole 32 to support bracket 10 in the desired position. The universal band assembly 40 is next adjusted to have the desired length, such that it defines an arc of somewhat less than 180° of the pole circumference. Length adjustment of the band assembly 40 is, of course, obtained by adjustably overlapping the band segments 44 and 45, and inserting the bolts 48 and 49 through those apertures 46 which are in registry when the band segments are overlapped to the extent required to provide the desired band assembly length. The universal band assembly and the attaching bolts 41 and 42 are then elevated to the desired position, and the band is assembled to the support bracket 10. Although the band segments 44 and 45 are flexible enough to enable a person to manually bend them to the desired shape, this is generally unnecessary since, as supplied, they have a radius slightly exceeding the largest radius of the poles with which they are to be assembled. Consequently, as the attaching bolts 41, 42 are tightened, the inner surface of the band assembly is drawn into engagement with the periphery of the pole, and the tapered heads of the studs 48, 49 are driven into the pole.

As hereinbefore indicated, the support bracket 10 and associated universal band 40 is designed to accommodate electrical devices of various sizes, such, for example, as transformers rated at from 15 kva. to 100 kva. load capacity. The 15 kva. transformers, for example, are generally provided with two mounting lugs arranged on 12-inch centers, one above the other. To mount a plurality of 15 kva. transformers on a lighting pole cluster, a plurality of adapter plates 70 (Fig. 1) are provided. Each of the plates 70 has diagonally located holes 71 and 72 corresponding in location to the holes 14 and 16 in each of the support faces 11, 12, 13 of the support bracket 10 for attachment thereto. The adapter plates 70 are further provided with a pair of vertically spaced holes 73 and 74 arranged on 12-inch centers for coaction with the mounting lugs of the 15 kva. transformers to be supported. It will readily be seen, therefore, that by using three adapter plates 70, three 15 kva. transformers may be mounted in different positions in a cluster on a single support bracket 10 mounted on the support pole in the manner just described.

It will be appreciated that the adapter plates 70 as well as the support faces 11, 12, 13 on the transformer support bracket 10 are spaced by the feet and lug arrangement at a substantial distance from the surface of the pole so as to permit attachment of the adapter plates and transformers to the support bracket 10 after the bracket is permanently attached to the pole. This arrangement has the advantage that after an installation has been completed it is readily possible to interchange or attach additional transformers to the support bracket 10 without removing the bracket assembly from the pole.

Distribution transformers which have a rating of 25, 37½ or 50 kva. are usually provided with two vertically arranged mounting lugs on 24-inch centers. Since transformers in this range of sizes are relatively heavy, it has been found desirable to support such transformers by two support bracket assemblies arranged on the pole 32, one above the other, on 24-inch centers. With such an arrangement no adapter plates are necessary, and the vertically aligned central apertures 15 in corresponding support faces of the vertically spaced support brackets 10 may be used directly to receive the mounting lugs of a transformer for support thereof.

Since it is important that each transformer be accurately aligned in a vertical position when two bracket assemblies are used, corresponding support faces of each of the brackets 10 must be accurately aligned. In prior art arrangements wherein the support bracket assembly comprises a plurality of parts, each of which includes a support face, it is necessary separately to align corresponding faces in associated brackets. With the cluster support bracket of the present invention, however, when one pair of corresponding faces is aligned, all faces are also aligned.

Referring to Fig. 3, there is shown a transformer cluster support employing two bracket assemblies 10 and which is adapted to support one 15 kva. transformer and two transformers having ratings within the range 25 to 50 kva. Even though one bracket assembly 10 might be used to mount the 15 kva. transformer, since two bracket assemblies are necessary to mount the two larger transformers, it is desirable to provide an arrangement whereby the weight of the 15 kva. transformer is taken up by both of the brackets. Therefore, a channel member 80 which is provided with five equally spaced holes 81 in the bottom portion thereof, is attached between the bracket assemblies by means of bolts 82, 83 coacting with the outer holes 81 in the channel 80 and the center holes 15 in the mounting faces 13 of the spaced brackets 10. In the particular embodiment illustrated, the holes 81 are arranged on 6-inch centers, and the 15 kva. transformer mounting lugs are inserted within the outer two unused holes 81 for attachment to the support bracket 80. The two larger transformers are supported directly on the support faces 11, 12 on opposite sides of the pole.

Referring to Fig. 4, there is illustrated a transformer cluster support utilizing a pair of support bracket assemblies and which is arranged to support a plurality of the larger transformers having ratings varying between 75 and 100 kva. These larger type distribution transformers are provided with four mounting lugs arranged at the corners of a rectangle which is twelve inches by twenty-four inches. Adapter plates 85 are positioned on each of the support faces of the bracket 10 and are provided with a central aperture (not shown) which is adapted to coact with a headed bolt 86 inserted therein and through the central hole 15 in any one of the mounting faces 11, 12, 13 for attachment of the adapter plates to the bracket 10. In alignment with the central aperture in the adapter plate 85, there are provided at the respective ends of the plate elongated slots 87 and 88 which are adapted to accommodate the one pair of the mounting lugs of the transformer to be supported. Slots, rather than circular holes, are provided in the adapter plate to facilitate attachment of the transformer mounting lugs thereto.

While there has been described what is at present considered to be the preferred embodiment of the present invention, it will be understood that various modifications may be made therein which are within the true spirit and scope of the invention as defined in the appended claims.

What is claimed as new and desired to be secured by Letters Patent of the United States is:

1. A support for mounting a plurality of electrical devices in different positions upon a pole, said support comprising a symmetrical support bracket having a front, center section spaced from the pole and provided with a flat supporting portion for supporting a first of the electrical devices, first and second legs respectively angularly related to and extending rearwardly of said center section, each of said legs being provided with a supporting portion for supporting an additional electrical device, first and second intermediate portions respectively interconnecting said center section and said first and second legs, first and second feet respectively pivotally supported from said first and second intermediate portions and extending inwardly from said bracket to engage said pole, means for securing said feet to said pole, a flexible band structure adapted to partially wrap around the pole and having first and second attaching means at its opposed ends extending outwardly from the pole, and means including a first bolt supported from said first intermediate portion adjacent said first foot for coacting with said first attaching means and further including a second bolt supported from said second intermediate portion adjacent said second foot for coacting with said second attaching means to effect the attachment of the flexible band structure to the bracket and to force said feet into engagement with the pole, said last mentioned means including the bolts being respectively spaced from said feet.

2. The support of claim 1 wherein there are additionally provided vertically extending bolts for said pivotal feet, which bolts are respectively perpendicularly related to said first and second bolts thereby causing the pivotal feet to be urged against the surface of the pole incident to operation of said last mentioned means.

3. A support for mounting a plurality of electrical devices at elevated positions upon a pole, said support comprising a bracket having a front, center section spaced from the pole and provided with a first mounting portion, first and second leg means on said bracket spaced from and extending rearwardly of said center section, said first and second leg means being respectively provided with second and third mounting portions extending substantially parallel to each other and substantially perpendicular to the first mounting portion so that electrical devices supported upon said mounting portions are oriented around three sides of the pole, first and second intermediate means respectively interconnecting said center section and said first and second leg means, first and second pivotal feet means respectively supported from said intermediate means for engagement with the pole, and a band assembly extending partially around the pole and including adjustable connecting means supported from said intermediate means in spaced relation to said pivotal feet.

4. In a support for mounting at least one electrical device at an elevated location on a pole, a member configured to be disposed around substantially one-half of the pole, said member having middle and end supporting portions substantially right angularly related to one another, a plurality of feet pivotally supported and extending inwardly from said member, said feet being respectively supported from the member intermediate its middle and its end portions for engagement with said pole, and means for securing said feet to said pole.

5. A support for mounting a plurality of electrical devices in different positions at an elevated location on a pole, said support comprising a support bracket having a front center portion and first and second leg portions angularly related to and extending rearwardly of said center portion, said portions respectively being adapted to support said electrical devices, a pair of pivotal feet respectively supported from said bracket between adjacent supporting portions and extending inwardly from said bracket for engagement with the pole, flexible means having the inner surface thereof adapted to conform to and engage the surface of part of said pole, and separate means supported from said bracket adjacent to said feet for coacting with the ends of the means thereby to urge said feet into engagement with said pole.

6. A support for mounting a plurality of electrical devices in different positions at an elevated location on a pole, comprising a bracket having a front center portion and end portions angularly related to and extending rearwardly of said center portion, each of said portions being adapted to support therefrom one of said electrical devices, a pair of feet pivotally supported from said bracket at points remote from said end portions and inwardly directed therefrom for engagement with said pole, flexible means having an inner surface substantially conforming to a portion of the surface of said pole, and means respectively supported between the feet and the end portions of the bracket for coacting with the ends of said flexible means to connect the flexible means to the bracket.

7. The support of claim 5 wherein said flexible means include flexible bands having overlapping portions detachably secured together, whereby said flexible bands and said separate means can be adjusted to permit use of said support with poles of different diameters.

References Cited in the file of this patent

UNITED STATES PATENTS

| 1,541,715 | Johnson | June 9, 1925 |
| 1,798,613 | Manson | Mar. 31, 1931 |
| 1,852,347 | Getz | Apr. 5, 1932 |
| 1,915,715 | Bodendieck | June 27, 1933 |
| 2,058,611 | Merkle | Oct. 27, 1936 |
| 2,570,985 | Riemenschneider | Oct. 9, 1951 |
| 2,706,023 | Merritt | Apr. 12, 1955 |
| 2,708,087 | Blackstone | May 10, 1955 |
| 2,720,016 | Johannsen | Oct. 11, 1955 |